United States Patent [19]

Leaver

[11] Patent Number: 4,899,940

[45] Date of Patent: Feb. 13, 1990

[54] SPRAY WASHING DEVICE FOR MOTOR VEHICLES AND THE LIKE

[76] Inventor: Gardner A. Leaver, P.O. Box 835, Montauk, N.Y. 10514

[21] Appl. No.: 125,718

[22] Filed: Nov. 30, 1987

Related U.S. Application Data

[63] Continuation of Ser. No. 857,351, Apr. 30, 1986, abandoned.

[51] Int. Cl.$^4$ ............................................. B05B 7/02
[52] U.S. Cl. ................................. 239/526; 239/530; 239/532; 239/587; 401/289
[58] Field of Search ............... 239/525, 526, 532, 530, 239/587; 401/289

[56] References Cited

U.S. PATENT DOCUMENTS

| | | | |
|---|---|---|---|
| 1,115,533 | 11/1914 | Hartwell . | |
| 1,268,709 | 6/1918 | Gill | 239/532 |
| 1,281,005 | 10/1918 | Herman | 239/587 X |
| 1,461,824 | 7/1923 | Hilgerink . | |
| 1,565,780 | 12/1925 | Blakey | 401/289 X |
| 1,818,388 | 8/1931 | Farley | 239/587 X |
| 2,293,390 | 8/1942 | Hengesbach . | |
| 2,596,191 | 5/1952 | Windhom, Jr. . | |
| 2,613,112 | 10/1952 | Fletcher . | |
| 2,639,945 | 5/1953 | Rowlett . | |
| 2,731,300 | 1/1956 | Jansen | 239/587 X |
| 2,980,343 | 4/1961 | Hays | 239/525 X |
| 3,001,533 | 9/1961 | Holdren . | |
| 3,207,444 | 9/1965 | Kelley et al. . | |
| 3,361,300 | 1/1968 | Kaplan | 239/526 X |
| 3,829,023 | 8/1974 | Bouillard | 239/318 |

FOREIGN PATENT DOCUMENTS 7806012  5/1978  Netherlands .................. 239/525

Primary Examiner—Andres Kashnikow
Assistant Examiner—Patrick N. Burkhart
Attorney, Agent, or Firm—Schweitzer & Cornman

[57] ABSTRACT

A spray washing appliance is disclosed, having special utility in connection with washing of motor vehicles and the like. The appliance comprises a primary gripping handle, typically in the configuration of a pistol grip, which mounts an elongated, rotatable wand provided at its outer end with a spray discharge nozzle. The wand has a manipulating grip, spaced from the primary grip, and is provided with at least one relatively sharp bend adjacent the nozzle portion, and preferably with a second, opposite bend part way between the manipulating grip and the nozzle section. An operator holds the appliance with the primary grip in one hand and the manipulating grip in the other. By rotating the wand relative to the handle, the operator can with ease and convenience spray all areas of a vehicle, including relatively inaccessible areas, such as the undercarriage, roof, etc.

2 Claims, 2 Drawing Sheets

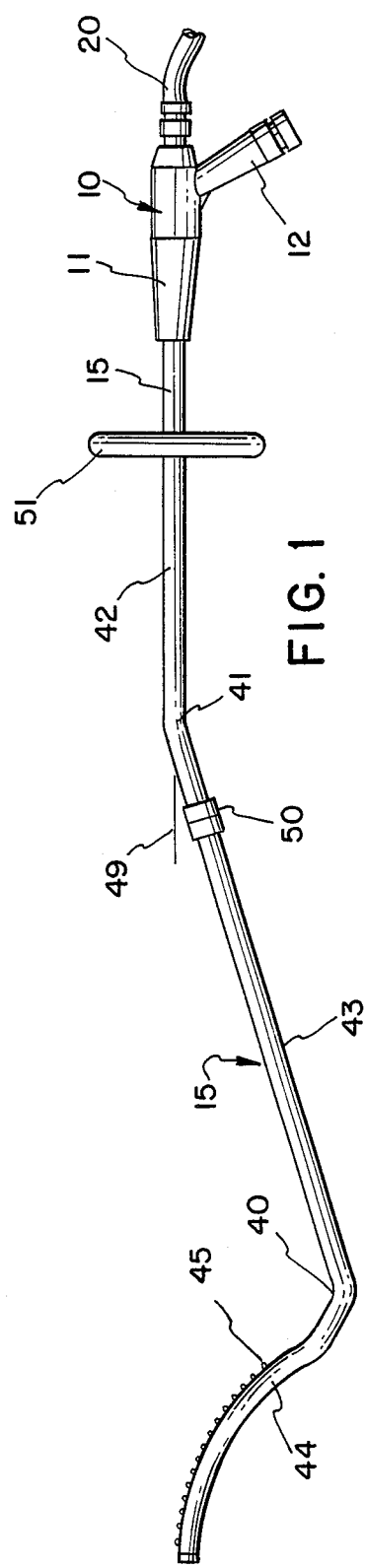
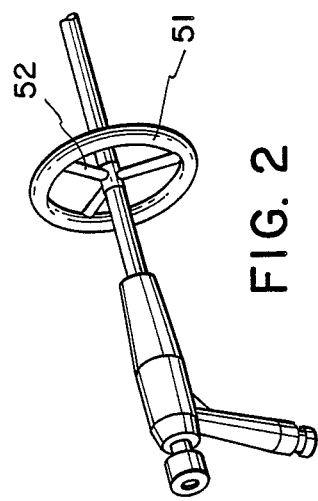
FIG. 1
FIG. 2

SPRAY WASHING DEVICE FOR MOTOR VEHICLES AND THE LIKE

RELATED APPLICATIONS

This application is a continuation of my prior application Ser. No. 857,351, filed Apr. 30, 1986, now abandoned.

BACKGROUND AND SUMMARY OF THE INVENTION

Manual washing of motor vehicles and the like, although widely practiced by many owners, suffers certain shortcomings as compared to commercial, drive-through establishments, for example. Among the disadvantages is the difficulty involved in effectively washing and rinsing the undercarriage, and also areas of the roof. Accordingly, it is a rather ordinary practice for automobile owners, who regularly wash their own vehicles, to take these vehicles periodically to commercial washing establishments, in order to have a more complete washing, particularly of parts of the undercarriage. Although a wide variety of attachments and other devices is available to assist in manual washing of vehicles, all of those known to the applicant have significant shortcomings in terms of performance, ease of use, cost, complexity or the like.

In accordance with the present invention, a novel and significantly improved vehicle washing device is provided, which not only greatly facilitates manual vehicle washing operations, but enables the operation to be carried out with a greater effectiveness than heretofore. At the same time, the device of the invention is of a highly simplified nature, capable of economical manufacture, and thus available at a reasonable cost in relation to other, less effective attachments and devices for similar purposes.

In a preferred form of the invention, the spray washing device includes a pistol grip style of handle, itself more or less conventional in form and construction, which is provided with an elongated, forwardly extending spray wand of special configuration, to be described, which terminates in an array of spray nozzles spaced longitudinally along the outer end extremity of the wand. According to the invention, the wand is rotatably mounted within the pistol grip handle for free rotation, advantageously through 360° but in any event not less than about 180°. The wand is provided, adjacent to the pistol grip handle, with a manipulating grip, preferably in the form of a spoked wheel. This enables the wand to be easily gripped by one hand of the user in any rotary position of the wand and provides for an easy, comfortable holding and manipulation of the assembly as a whole, with the user having one hand on the pistol grip handle and the other hand on the wand manipulating wheel.

In accordance with one aspect of the invention, the wand is provided adjacent its outer extremity with a deep bend, such that the outer extremity of the wand, being that portion containing the spray nozzles, lies at a substantial angle to the rotational axis of the wand in its pistol grip handle. In addition, the general orientation of the individual, longitudinally spaced nozzles on the angularly disposed outer portion of the wand is such as to discharge the individual spray streams generally toward the "inside" of the angle formed by the outer extremity of the wand with adjacent portions of the wand.

In a highly preferred form of the invention, the wand is provided with a double bend, first in one direction, at a location spaced well away from the nozzle portion, and then in an opposite direction adjacent the nozzle portion. The compound bend forms a "dog leg" configuration. With a wand having such a configuration, the operator of the device can easily reach portions of the undercarriage and/or along the roof of the vehicle with a minimum reorientation of the device as a whole and with a rather moderate change in body position, by reason of the compound bend in the spray wand in conjunction with the ability to rotate the wand to any orientation relative to the pistol grip handle.

To advantage, the outer extremity of the wand, containing the longitudinally spaced spray nozzles, is formed in an arcuate contour, to provide some degree of angular dispersion of the individual water jets. Additionally, the preferred form of the invention also includes means, typically incorporated into the pistol grip handle, for introducing an appropriate detergent or other cleaning solution into the water stream when desired.

For a more complete understanding of the above and other features and advantages of the invention, reference should be made to the following detailed description of a preferred embodiment of the invention and to the accompanying drawings.

DESCRIPTION OF THE DRAWING

FIG. 1 is an elevational view of a spray device according to the invention for washing motor vehicles and the like.

FIG. 2 is a fragmentary perspective view of the spray device of FIG. 1, showing in particular details of a manipulating grip handle mounted on a rotatable wand.

DESCRIPTION OF A PREFERRED EMBODIMENT

Figure 3:
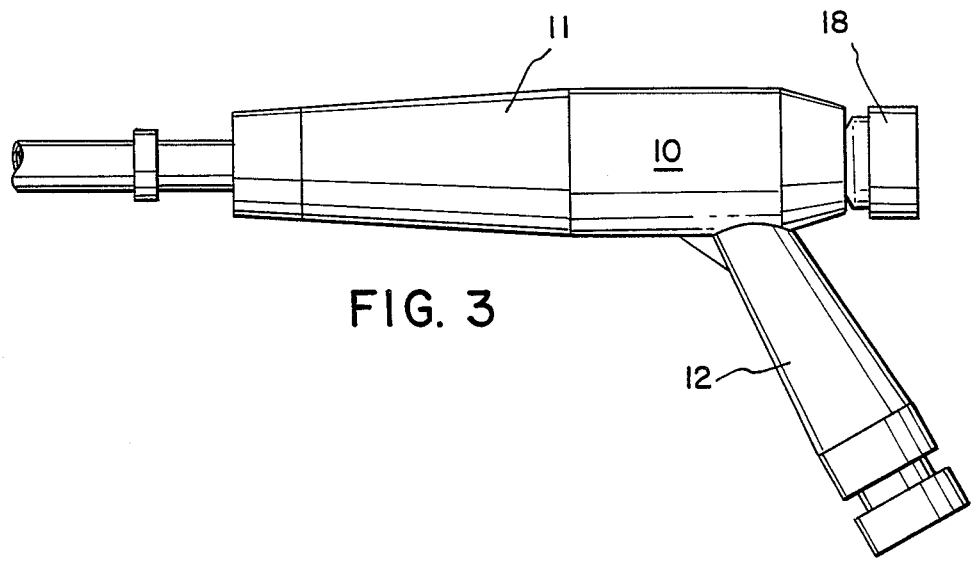
FIG. 3 is an enlarged elevational view of the pistol grip type handle of the device of FIG. 1.

Referring to the drawings, the reference numeral 10 designates in a general way a pistol grip style handle for the new spray washing apparatus. The handle per se may be of a conventional design, preferably injection molded of a suitable structural plastic material. The handle typically is provided with a main body portion 11 having an integral hand grip portion 12 extending from adjacent one end thereof.

Figure 4:
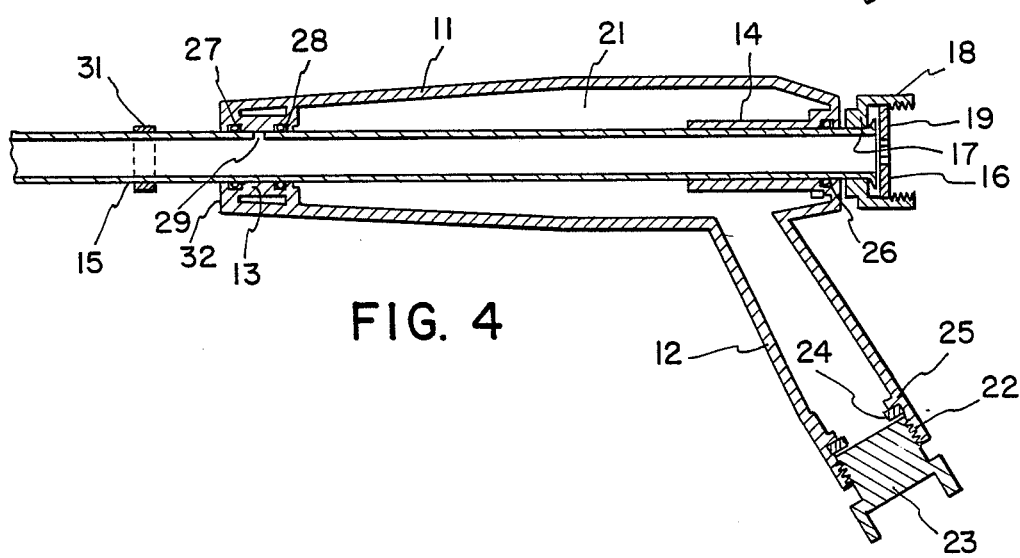
FIG. 4 is a longitudinal cross sectional view of the handle device of FIG. 3.
Figure 5:
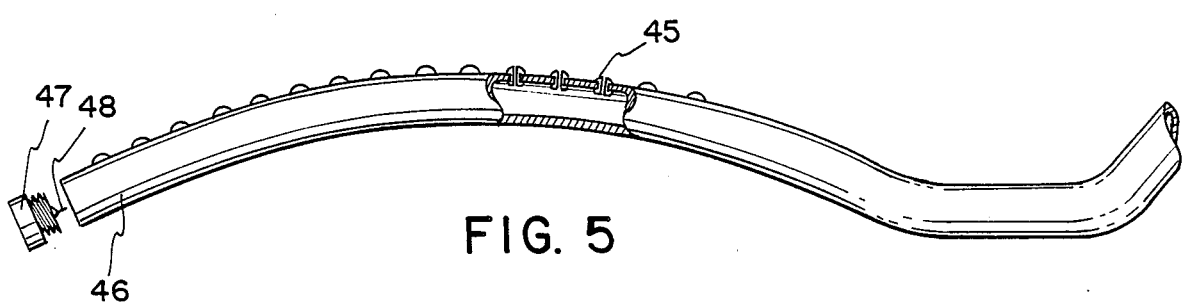
FIG. 5 is an enlarged elevational view, with parts broken away for clarity, showing the nozzle portion of the spray device of FIG. 1.

As shown in FIG. 4, the handle portion 10 is of generally hollow construction, having front and rear bearing sections 13, 14 for rotatably supporting a tubular wand 15. The latter typically is formed of relatively lightweight, thin walled aluminum tubing. At its rearward end, the wand 15 is provided with a flange 16 which engages a shoulder 17 of a rotatable, internally threaded collar 18. A perforated disc 19 is permanently installed in the collar, confronting the flanged end of the wand, whereby the wand is permanently coupled to the collar, with the collar remaining rotatable relative to the wand. The internal threads of the collar are standard hose coupling threads, arranged to receive and be coupled with the male end of a standard garden hose 20.

As shown in FIG. 4, the hollow body 11 of the handle 10 forms a cavity 21 adapted to contain a liquid washing solution, such as a special detergent appropriate for automative vehicles, for example. At the base of the handle 12, there is an internally threaded coupling section 22 arranged to receive a threaded plug 23, seating the plug against a washer 24 and internal shoulder 25. The handle interior can be filled with washing solution by directing the grip portion 12 upwardly to serve as a fill spout, when the plug 23 is removed.

The rear bearing section 14 of the handle is provided with an internal O-ring 26, while the forward bearing section 13 is provided with spaced front and rear O-rings 27, 28. These O-rings allow for both rotary and longitudinal movement of the wand 15 relative to the pistol grip handle, without leakage of the washing solution contained within the cavity 21.

In accordance with known principles, washing solution may be discharged in effective amounts from the cavity 21 into a water stream flowing through the wand 15, by executing a slight rearward displacement of the wand relative to the handle. This causes a wall aperture 29, provided in the wand 15, to be removed from a position between the front O-rings 27, 28 to a position communicating with the interior of the cavity. When the wand is thus slightly retracted, the foward flow of water (right to left in FIG. 4) through the wand 15 sets up a slight pressure reduction in the area of the wall aperture 29, causing the contained washing solution to be drawn into the flowing water stream in controlled quantities. Rinsing off of the washing solution may be accomplished by displacing the wand forwardly again, to position the wall aperture 29 between the O-rings 27, 28, isolated from the washing solution. The O-rings 27, 28 also serve, of course, to prevent the outflow of water under pressure from the interior of the wand 15.

It may be desirable to provide a stop collar 31 on the wand 15, a short distance in front of the forward wall 32 of the handle 10. The stop collar is arranged to limit the rearward movement of the wand 15 to a distance sufficient to bring the wall aperture 29 into communication with the interior of the handle.

In the preferred form of the invention, the wand 15 is of substantial length, for example four feet, and is provided with at least one angular bend 40 adjacent the outer end extremity, and more preferably with a second angular bend 41 located a short distance (e.g. 18 inches) forward of the handle 10. The bends 40, 41 desirably are in the same plane and in opposite directions. Typically, the outer bend 40 is at a somewhat sharper angle than the inner bend 41. As shown best in FIG. 1, the bends 40, 41 effectively divide the wand into three rather distinct sections, a support section 42 which is engaged in and supported by the handle 11, a first angularly disposed section 43 and a second angularly disposed section 44. Preferably, all three sections lie substantially in a common plane.

As is evident in FIG. 1, the outermost section 44 of the wand is a nozzle section, and in the illustrated arrangement the nozzle section advantageously is of arcuate form having a substantial plurality of small water discharge orifices 45 spaced a short distance (e.g., ¾ of an inch) apart to form an arcuate nozzle array. Typically and desirably, the discharge axis of the nozzles 45 is substantially in the common plane of the wand 15, although such an arrangement is not required. Conventionally, the outer extremity 46 of the wand 15 may be closed by means of a threaded plug 47 provided with a projecting pin 48, which may be utilized to clean out the spray orifices 45 as necessary.

Although it is to be understood that the device of the invention may be provided with various configurations and nozzle arrangements, the wand configuration shown in FIG. 1 is particularly desirable. By way of example only and not of limitation, the support section of the wand may have a length of about fourteen inches, and is joined at its outer end to the intermediate section 43. The intermediate section has a length of approximately two feet and is disposed at an angle of, for example, 20° to the axis of the support section 42. The nozzle section 44 may have a length of, for example, twelve to fourteen inches and may be disposed at an included angle of around 120° to the axis of the intermediate section 43. In the illustrated arrangement, portions of the nozzle section 44 intersect with or lie close to the axis of rotation of the wand, designated by the reference numeral 49. The spray nozzles are positioned so as to project toward the "closed" side of the angle formed by the wand sections 43, 44, such that the sprays are directed at least partly back toward the operator.

The wand may be formed in a single piece, or may be provided with one or more quick detachable couplings 50, as desired, in order to accommodate disassembly for packaging and shipping and/or changing of the wand and/or nozzle configurations.

As a significant feature of the invention, the wand 15 is provided, at a position spaced a short distance in front of the handle 10, with a manipulating handle or grip 51. Preferably, the manipulating handle is mounted so as to be coaxial with the barrel portion 11 of the handle 10 and is arranged to be conveniently gripped by one hand of an operator, who is holding the main handle 10 with the opposite hand. The grip 51 thus enables two-handed support of the device, to facilitate its convenient handling by the operator. Importantly, the grip 51 is of a design such as to accommodate rotational movement of the wand 15 relative to the handle 11. To this end, the grip 51 is most advantageously in the form of a wheel, typically provided with a relative minimum number of spokes 52, such that the annular portion of the wheel may be conveniently held by the operator in any rotary position of the wand. If desired, the grip wheel 51 may be adjustably mounted on the support section 42 of the wand, for positioning at any point along the length of that section, to suit the convenience and comfort of the operator.

In the operation of the devcie, water supplied through the inlet hose 20, flows through the wand 15 and is discharged through its array of spray nozzles 45 at relatively high velocity. In the illustrated form of the invention, the handle 10 does not include means to control the main flow of water through the wand 15. However, manually operated valve devices, suitable for the purpose, are well known and can be provided if desired.

The apparatus is held by the operator with two hands, typically one hand on the grip portion 12 of the main handle, and the other hand on the manipulating grip 51. Through rotary orientation of the wand, and appropriate direction of the handle 10, the array of jet sprays from the nozzles 45 may be directed in any direction. Importantly, the sprays can easily be directed upwardly against the bottom of the undercarriage, by an operator standing comfortably at the side of the vehicle with the device angled slightly downward and with the nozzle portion 44 of the wand projected underneath the vehicle. With the apparatus so disposed, a wide area can be covered with the spray, by means of a slight rotation of the manipulating wheel 51. In order to reach the roof of the vehicle, the manipulating wheel 51 is rotated through 180°, so that the spray jets 45 are directed generally downward. Although some redirection of the handle 10 is required in thus reorienting the spray, the necessary amount of movement of the handle 10 is greatly reduced by the "dogleg" bend configuration of the wand 15, as will be understood. This contributes importantly to the comfort and convenience of the operator during the use of the device.

At any time that the operator desires to discharge washing solution, the manipulating wheel 51 is drawn toward the main handle grip 10, to shift the wand longitudinally and expose the wall orifice 29 to the internal cavity 21 of the handle. Washing solution in controlled quantities is then discharged through the nozzles 45 until such time as the operator desires to commence rinsing operations, by shifting the wand forward, to the position shown in FIG. 4, for example.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A spray washing appliance for motor vehicles and the like, which comprises
    (a) a primary hand held support member including a gripping handle of a size and configuration to be held conveniently in one hand,
    (b) an elongated tubular wand of lightweight tubular construction having a first portion mounted by and extending through said support member and a second portion, integral with said first portion, projecting a long distance forward of said support member,
    (c) rotatable connecting means for connecting a hose to said first wand portion for supplying water under pressure thereto,
    (d) said support member having bearing means supporting the first portion of said wand for rotation about a predetermined axis,
    (e) said wand having a third portion adjacent its forward end disposed at an angle to said axis and mounting nozzle means,
    (f) said first and third portions of said wand defining a plane and defining an interior included angle of substantially less than 180° and an exterior angle of substantially than 180°,
    (g) said discharge nozzle means comprising an elongated wand section disposed in said plane and having a plurality of nozzle openings spaced along its length for discharge of a fan-like array of spray jets generally in said plane, and generally in the direction of said interior included angle and at least partially directed back toward the first wand portion and the operator of the appliance,
    (h) said second portion of said wand being generally coaxial with said axis and mounting a manipulating grip adjacent said gripping handle for rotating said wand relative to said gripping handle,
    (i) said manipulating grip forming a support means and being of a size and shape adapted for convenient gripping one hand of an operator for both holding and movably guiding and manipulating the appliance as a whole and controllably rotationally orienting said wand relative to said support member.

2. A spray washing appliance according to claim 1, further characterized by
    (a) said manipulating grip being in the form of a spoked wheel.

* * * * *